US012808303B2

(12) United States Patent
Torres et al.

(10) Patent No.: US 12,808,303 B2
(45) **Date of Patent: *Nov. 24, 2026**

(54) CENTER TIE ROTOR ANNULAR SEAL

(71) Applicant: RTX Corporation, Farmington, CT (US)

(72) Inventors: Luis Manuel Torres, Middletown, CT (US); Matthew E. Bintz, West Hartford, CT (US); Ryan Hamilton Quinn, Berlin, CT (US); Fadi S. Maalouf, East Hampton, CT (US); Madeline Taylor Zackeo, Weatogue, CT (US); Joseph T. Caprario, Rocky Hill, CT (US); Patrick Daniel O'Brien, North Branford, CT (US)

(73) Assignee: RTX Corporation, Farmington, CT (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/747,972

(22) Filed: Jun. 19, 2024

(65) Prior Publication Data

US 2025/0389200 A1 Dec. 25, 2025

(51) Int. Cl.

| | |
|---|---|
| ***F01D 11/00*** | (2006.01) |
| ***F01D 5/02*** | (2006.01) |
| ***F16J 15/02*** | (2006.01) |

(52) U.S. Cl.

CPC ............ *F01D 11/005* (2013.01); *F01D 5/025* (2013.01); *F16J 15/02* (2013.01); *F05D 2240/55* (2013.01)

(58) Field of Classification Search

CPC ......... F01D 11/005; F01D 5/025; F16J 15/02; F05D 2240/55

See application file for complete search history.

(56) References Cited

U.S. PATENT DOCUMENTS

| | | | |
|---|---|---|---|
| 2,804,323 | A | 8/1957 | Morley |
| 4,737,076 | A | 4/1988 | Bonner et al. |
| 5,054,996 | A | 10/1991 | Carreno |
| 5,288,210 | A | 2/1994 | Albrecht et al. |
| 6,250,883 | B1 | 6/2001 | Robinson et al. |
| 6,666,645 | B1 | 12/2003 | Arilla et al. |
| 8,152,471 | B2 | 4/2012 | Pichel |

(Continued)

FOREIGN PATENT DOCUMENTS

| | | | | |
|---|---|---|---|---|
| EP | 3546700 A1 | | 10/2019 | |
| EP | 3708773 A2 | | 9/2020 | |
| FR | 47869 E | * | 8/1937 | ............. F01D 5/025 |

OTHER PUBLICATIONS

European Search Report dated Nov. 3, 2025 for European Patent Application No. 25182835.6.

(Continued)

*Primary Examiner* — Nicholas L Foster

(74) *Attorney, Agent, or Firm* — Bachman & LaPointe, P.C.

(57) ABSTRACT

A turbine engine rotor has a central shaft and a disk stack having disks encircling the shaft. A seal has in central axial cross-section: a rearwardly-open channel receiving a portion of one of the disks; a sleeve extending rearward from the channel and between the disk and the shaft; and a portion extending radially inward from the sleeve and having a forward surface restrained against forward movement relative to the shaft.

20 Claims, 11 Drawing Sheets

(56) References Cited

U.S. PATENT DOCUMENTS

| | | | | |
|---|---|---|---|---|
| 9,410,427 | B2 * | 8/2016 | Giannakopoulos | F01D 5/026 |
| 10,260,524 | B2 | 4/2019 | Hiester | |
| 10,774,742 | B2 * | 9/2020 | Giannakopoulos | F02C 6/08 |
| 10,808,627 | B2 | 10/2020 | Behling et al. | |
| 10,954,861 | B2 | 3/2021 | Bintz | |
| 11,067,090 | B1 | 7/2021 | Giannakopoulos | |
| 11,506,071 | B2 * | 11/2022 | Maalouf | F01D 5/025 |
| 12,123,305 | B2 * | 10/2024 | Alecu | F01D 5/066 |
| 2005/0232774 | A1 * | 10/2005 | Suciu | F01D 5/066 416/198 A |
| 2007/0107219 | A1 | 5/2007 | Suciu et al. | |
| 2007/0286733 | A1 | 12/2007 | Bouchard | |
| 2009/0016886 | A1 * | 1/2009 | Pichel | F01D 5/025 416/198 A |
| 2011/0280735 | A1 | 11/2011 | Dakowski et al. | |
| 2013/0323010 | A1 | 12/2013 | Mosley et al. | |
| 2013/0323077 | A1 * | 12/2013 | Giannakopoulos | F01D 5/025 416/93 R |
| 2016/0215792 | A1 * | 7/2016 | Hiester | F01D 25/12 |
| 2016/0362982 | A1 | 12/2016 | Judet et al. | |
| 2019/0292995 | A1 * | 9/2019 | Behling | F01D 5/081 |
| 2020/0056506 | A1 | 2/2020 | Stoyanov et al. | |
| 2020/0072084 | A1 | 3/2020 | Blaney et al. | |
| 2020/0291861 | A1 * | 9/2020 | Bintz | F01D 5/06 |
| 2022/0282631 | A1 | 9/2022 | Maalouf | |
| 2024/0167389 | A1 * | 5/2024 | Alecu | F01D 11/006 |
| 2026/0071551 | A1 * | 3/2026 | Torres | F01D 5/066 |

OTHER PUBLICATIONS

US Office Action dated Apr. 21, 2025 for U.S. Appl. No. 18/826,853.

* cited by examiner

CENTER TIE ROTOR ANNULAR SEAL

BACKGROUND

The disclosure relates to gas turbine engines. More particularly, the disclosure relates to disk-to-shaft sealing in center-tie rotors.

Gas turbine engines (used in propulsion and power applications and broadly inclusive of turbojets, turboprops, turbofans, turboshafts, industrial gas turbines, and the like) often feature center-tie rotors wherein a shaft passes centrally through a rotor disk stack with engagement between the shaft and stack such that the shaft is held in tension and the stack is held in compression.

Operational stresses (including thermal stresses and load stresses) may cause excursions between disks and shaft. Accordingly, there often are seals between disk and shaft. In an example high pressure compressor (HPC) rotor in a multi-spool engine an example sealing system involves a piston seal ring (PSR) held in an outer diameter groove in the shaft and interfacing with an inner diameter (ID) surface of a disk bore. The seal may isolate an inter-disk space aft thereof that's used to pass air radially inward to then pass aft to the turbine section for turbine cooling. Additionally, a diverted airflow may pass radially through holes in the shaft from forward of the seal to pass forward and/or aft within the shaft to provide cooling to other parts of the engine, such as the bearing compartment buffer system.

SUMMARY

One aspect of the disclosure involves a turbine engine rotor comprising: a central shaft; and a disk stack having a plurality of disks encircling the shaft. A seal has in central axial cross-section: a rearwardly-open channel receiving a portion of one of the disks; a sleeve extending rearward from the channel and between the disk and the shaft; and a portion extending radially inward from the sleeve and having a forward surface restrained against forward movement relative to the shaft.

In a further example of any of the foregoing, additionally and/or alternatively, the restraint is via contacting an aft facing surface of the shaft or a retaining ring carried by the shaft.

In a further example of any of the foregoing, additionally and/or alternatively, the shaft has a plurality of through-holes axially within a span of the sleeve.

In a further example of any of the foregoing, additionally and/or alternatively, the shaft is under axial tension and the seal is under axial tension.

A further example of any of the foregoing may additionally and/or alternatively include a circumferentially distributed plurality of venting gaps between the channel and the one disk.

In a further example of any of the foregoing, additionally and/or alternatively, a rear face of a radial web of the channel contacts the one disk.

In a further example of any of the foregoing, additionally and/or alternatively, an inner diameter face of an outer diameter wall of the channel contacts the disk.

In a further example of any of the foregoing, additionally and/or alternatively, the portion extending radially inward from the sleeve is in radial interference fit with the shaft.

In a further example of any of the foregoing, additionally and/or alternatively, the seal is a non-split full annulus.

A further aspect of the disclosure involves a gas turbine engine including the turbine engine rotor. The rotor is a high pressure compressor rotor and further comprises: a high pressure turbine rotor co-spooled with the high pressure compressor rotor on a high spool; a low spool comprising a low pressure compressor rotor and a low pressure turbine rotor; a combustor; and a gaspath sequentially through the low pressure compressor, high pressure compressor, combustor, high pressure turbine, and low pressure turbine.

A further aspect of the disclosure involves a method for assembling the turbine engine rotor, the method comprising: assembling the seal to the shaft; assembling a forward plurality of the disks to each other to form a forward substack; assembling the forward substack to the shaft; assembling a rearward plurality of the disks to each other and the forward substack and shaft to form a rearward substack including said one disk; and stretching the shaft to draw the seal to bear against the one disk.

In a further example of any of the foregoing, additionally and/or alternatively, the assembling the seal to the shaft comprises radial thermal interference fitting.

In a further example of any of the foregoing, additionally and/or alternatively, the assembling the rearward plurality of the disks to each other and the forward substack and shaft comprises: sequential installation of the rearward plurality of disks to the preassembled forward substack and shaft; and the assembling the rearward plurality of the disks to each other and the forward substack and shaft comprises thermally expanding the seal to receive the received portion of the one disk.

A further aspect of the disclosure involves a method for using the turbine engine rotor, the method comprising: driving rotation of the rotor; and the driving increasing a radial contact pressure between an inner diameter face of an outer diameter wall of the rearwardly-open channel and the received portion of the one of the disks.

A further example of any of the foregoing may additionally and/or alternatively include prior to the increasing, the driving closing a radial clearance between the inner diameter face of the outer diameter wall of the rearwardly-open channel and the received portion of the one of the disks.

A further aspect of the disclosure involves a turbine engine rotor comprising: a central shaft; and a disk stack having a plurality of disks encircling the shaft and held in compression by tension in the shaft. The rotor further comprises means for sealing between the shaft and a disk of the disk stack and applying axial bias between the shaft and the disk.

In a further example of any of the foregoing, additionally and/or alternatively, one or more of: the rotor is a high pressure compressor rotor of a multi-spool engine; the means comprises circumferentially distributed venting means; the means comprises a sleeve passing between an inner diameter surface of the disk and the shaft and axially overlapping a circumferential array of vent holes in the shaft; the axial bias draws said disk rearward; and the means provides an inward radial tension on the disk increasing with rotational speed.

A further aspect of the disclosure involves a turbine engine rotor seal comprising a single-piece metallic body encircling a central longitudinal axis and having in central longitudinal half section: a first end and a second end; channel at the first end open axially channel toward the second end; a sleeve extending from the channel; and a portion extending radially inward from the sleeve and having a surface facing toward the first end.

A further example of any of the foregoing may additionally and/or alternatively include venting means.

In a further example of any of the foregoing, additionally and/or alternatively, the venting means comprises one or more of: a circumferential array of apertures in the sleeve; a first circumferential array of recesses and/or protrusions in/on an inner diameter surface of an outer wall of the channel; and a second circumferential array of recesses and/or protrusions in/on an inner surface of an axial end wall of the channel.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

As is discussed further below, a conventional split ring PSR may be replaced by a non-split seal whose sealing engagement places it under axial tension between the shaft and the disk bore. The disk bore is a generally radially inboard portion of a disk protuberant in central axial cross-section with a thinner web extending radially outward to a disk rim which may bear the associated circumferential array of blade airfoils. These may be in the form of separate blades having attachment roots received in slots in the rim or may be blades of an integrally-bladed (e.g., single-piece) rotor. The bore functions to resist outward radial centrifugal pull on the blades in operation. The non-split seal may avoid or reduce air flow asymmetries and associated deformations and vibrations.

As is discussed further below, the action of the seal may essentially create a step discontinuity in the disk-to-disk axial compressive force in the rotor stack. This provides a higher axial engagement force aft of the particular disk than forward thereof.

Figure 11:
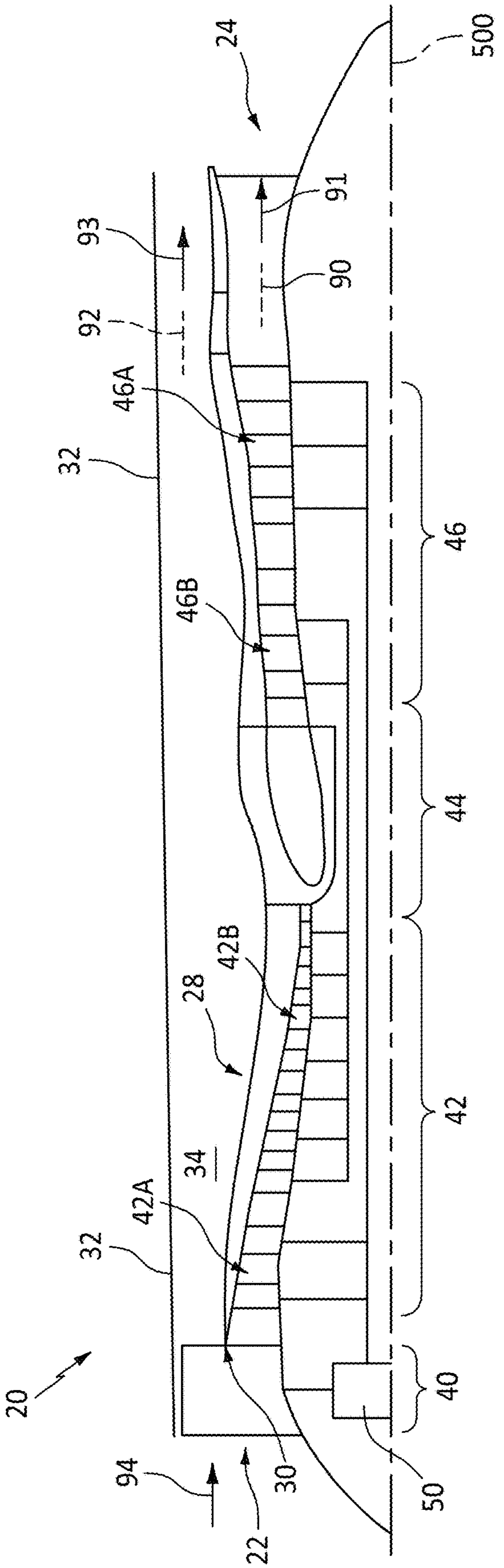
FIG. 11 is a schematic half section of a turbofan engine.

FIG. 11 shows a gas turbine engine 20. As is discussed below, the engine is illustrated as a schematic modification of a baseline existing engine. FIG. 11 schematically shows the example gas turbine engine 20 as a turbofan engine having a centerline or central longitudinal axis 500 and extending from an upstream end at an inlet 22 to a downstream end at an outlet 24. The example engine schematically includes a core flowpath or gaspath 90 passing a core flow 91 and a bypass flowpath 92 passing a bypass flow 93. The core flow and bypass flow are initially formed by respective portions of a combined inlet airflow 94 divided at a splitter 30. Thus, the example core flow starts out as air and downstream of the combustor comprises combustion products as combustion gas.

A core case (inner diameter (ID) case) or other structure 28 divides the core flowpath from the bypass flowpath. The bypass flowpath is, in turn, surrounded by an outer case (outer diameter (OD) case) 32 which, depending upon implementation, may be a fan case. A bypass duct 34 is configured radially between the ID case and OD case. From upstream to downstream, the engine includes a fan section 40 having one or more fan blade stages, a compressor 42 having one or more sections 42A, 42B each having one or more blade stages, a combustor 44 (e.g., annular, can type, or reverse flow), and a turbine 46 again having one or more sections 46A, 46B each having one or more blade stages. For example, many so called two-spool engines have two compressor sections (low pressure 42A and high pressure 42B) and two turbine sections (high pressure 46B and low pressure 46A) with each turbine section driving a respective associated compressor section and the low pressure downstream turbine section 46A also driving the fan (optionally via a gear reduction 50). Yet other arrangements are possible.

Various illustrated and non-illustrated features of the engine may be otherwise conventional including basic control hardware, programming, and use and manufacture methods.

Figure 1:
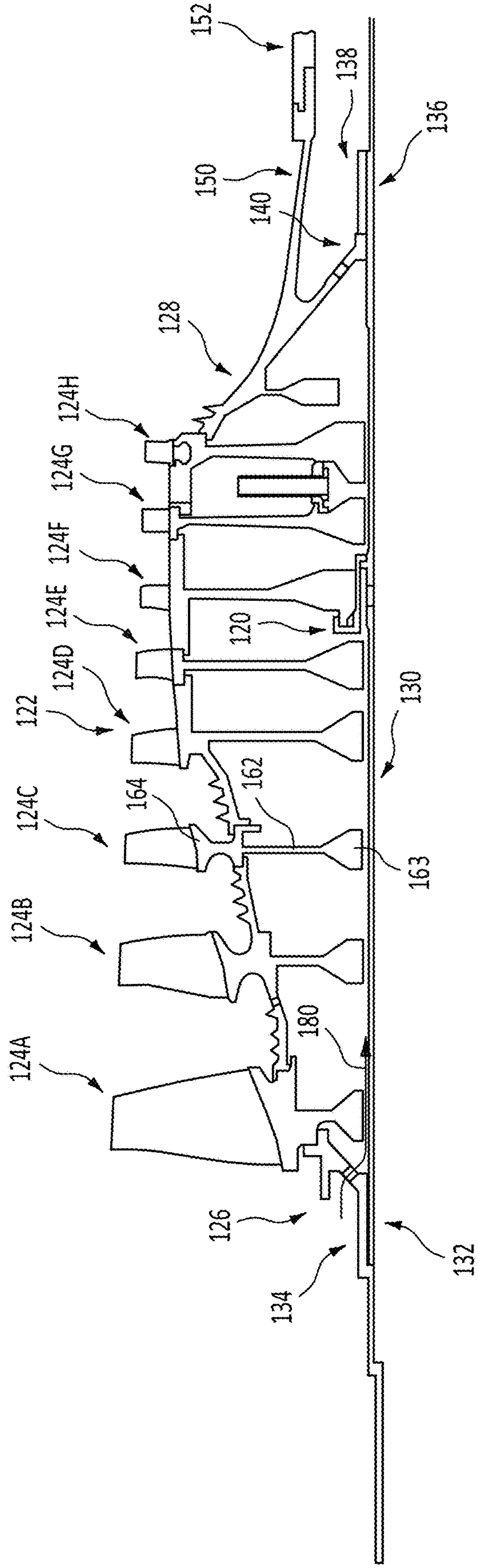
FIG. 1 is a half sectional view of a high pressure compressor (HPC) rotor.

FIG. 1 shows a seal 120 in the HPC rotor 122. The example rotor comprises a stack of disks 124A-124H. In this particular example, disks 124A-124G are known as “integrally-bladed rotors” (IBR) or “bladed disks” (blisks); whereas, the disk 124H has a circumferential array of blades mounted at the outer rim of the disk. The various disks have spacers extending fore or aft to mate with adjacent disks. FIG. 1 shows some of these spacers having radially inwardly open/facing distal shoulder surfaces receiving shoulders of the adjacent disk whereas others have radially outwardly open/facing shoulder surfaces. For example, the disk 124B has a forward spacer with a radially inwardly open shoulder and a rearward spacer with a radially outwardly open shoulder. Some of the spacers have radially outwardly protruding knife edges for cooperating with abradable material at inboard/inner platforms or shrouds of vane stages to create respective knife edge sealing systems.

The disk stack is held in axial compression between a forward hub 126 and an aft or rearward hub 128 to form a rotor stack. The term “rotor” is often interchangeably used to identify anything from a single disk (e.g., as in IBR noted above), expanding in scope to the disk stack (without hubs or shaft), then further to the extent of including the hubs and the shaft but only within a given section (e.g., treating the HPC and HPT rotor sections as distinct rotors), and up to an entire structure that rotates as a unit (which would include the HPC rotor, the HPT rotor, and the shaft all as a high speed rotor).

The example fore and aft hubs each have distal radially outwardly open shoulders mating with the adjacent disk. A tension shaft 130 holds the rotor under compression while the adjacent portion of the shaft is under tension. The example shaft 130 has an externally threaded forward end section 132 engaged to an internally threaded compartment

134 of the forward hub to transmit axial forces. The shaft 130 also has a second externally threaded portion 136 well aft thereof receiving a nut 138. The nut 138 holds a so-called kickstand portion (or inner hub) 140 of the aft hub 128 in axial compression to complete the compressive force transmission path through the rotor. The example aft hub 128 also has an outer hub or driving section 150 coupled to a corresponding forward portion 152 of the HPT rotor to allow the HPT rotor to drive rotation of the HPC rotor. In various embodiments, the shaft 130 may continue through to join with or become an HPT shaft. In the example shown, the hub 126 forward of the junction between the threaded sections 132 and 134 again becomes a portion of a high spool shaft and may mate with bearings, accessory drives, and the like.

The various disks have radially inboard protuberant bores 163 connected via thinner intermediate radial webs 162 to outer rim sections 164.

Figure 1A:
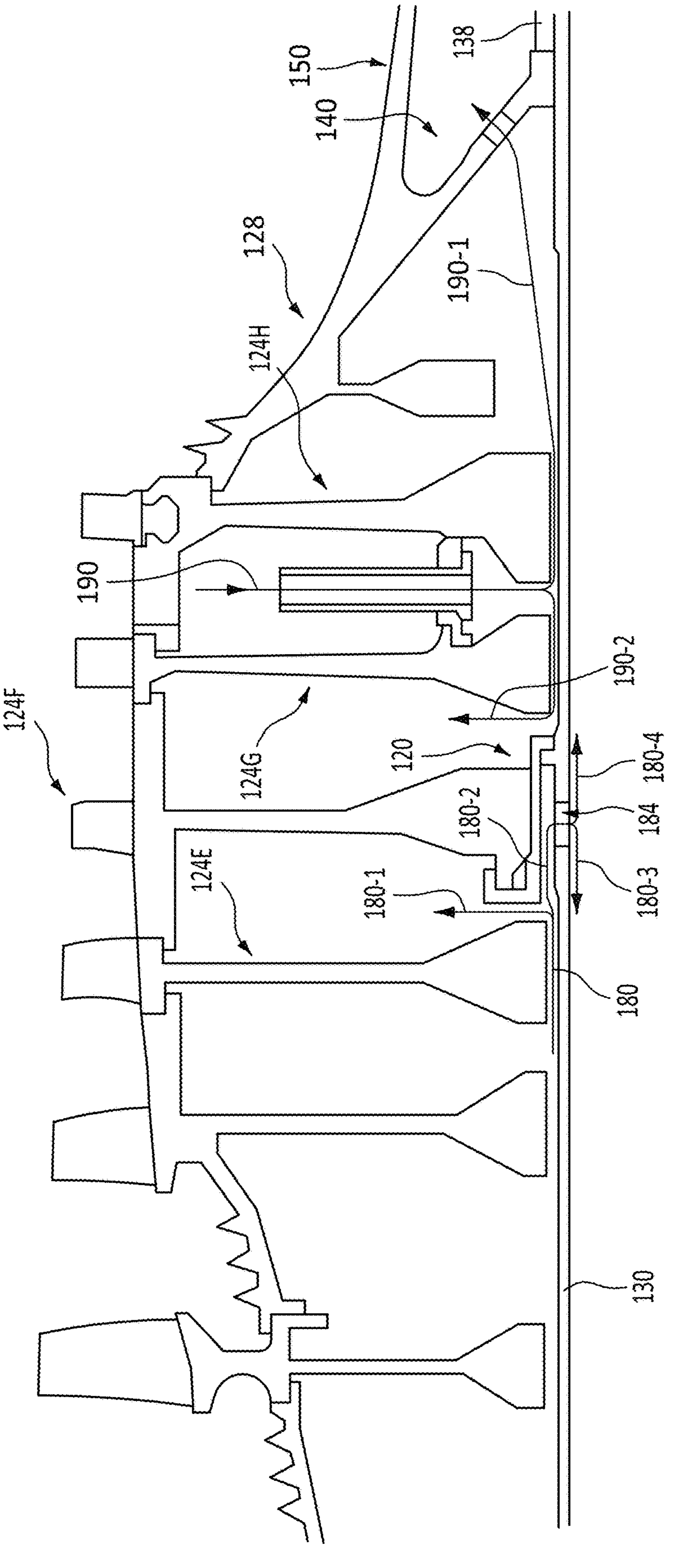
FIG. 1A is an enlarged view of the rotor of FIG. 1.

FIG. 1A shows a first leakage or bleed flow 180 from relatively upstream in the compressor passing several branches shown as 180-1, 180-2, 180-3, and 180-4. 180 passes between the ID surface of the bore of the disk 124E and the OD surface of the shaft 130 with 180-1 then passing radially outward between disks 124E and 124F for cooling and branch 180-2 passing through a circumferential array of apertures 184 in the shaft to then further branch into flows 180-3 and 180-4 with 180-3 then passing forward for forward bearing compartment buffering and 180-4 then passing aft for bearing compartment buffering. An additional leakage flow from yet downstream in the HPC is shown as 190. This passes radially inward between the disks 124G and 124H, then principally passing as a branch 190-1 between the bore ID surface of the disk 124H and the shaft OD surface to ultimately pass through a circumferential array of apertures in the inner hub/kickstand 140 for HPT cooling. The seal 120 isolates these flows from each other. A further branch 190-2 may pass forward between the bore ID surface of the disk 124G and the shaft OD surface to ultimately pass radially outward between the disks 124F and 124G to cool such disks.

Figure 1B:
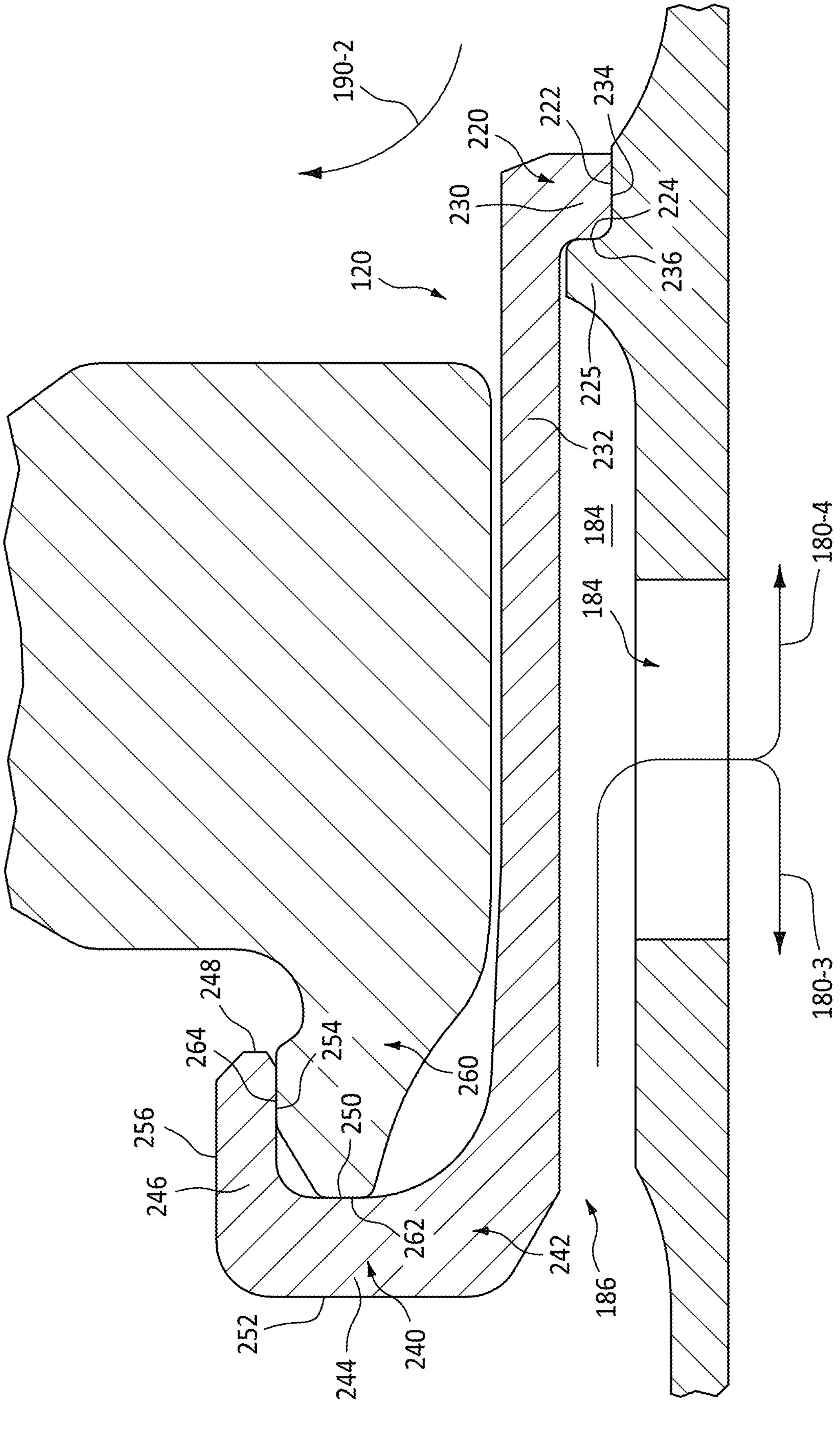
FIG. 1B is a further enlarged view of a seal region of the rotor of FIG. 1.
Figure 2:
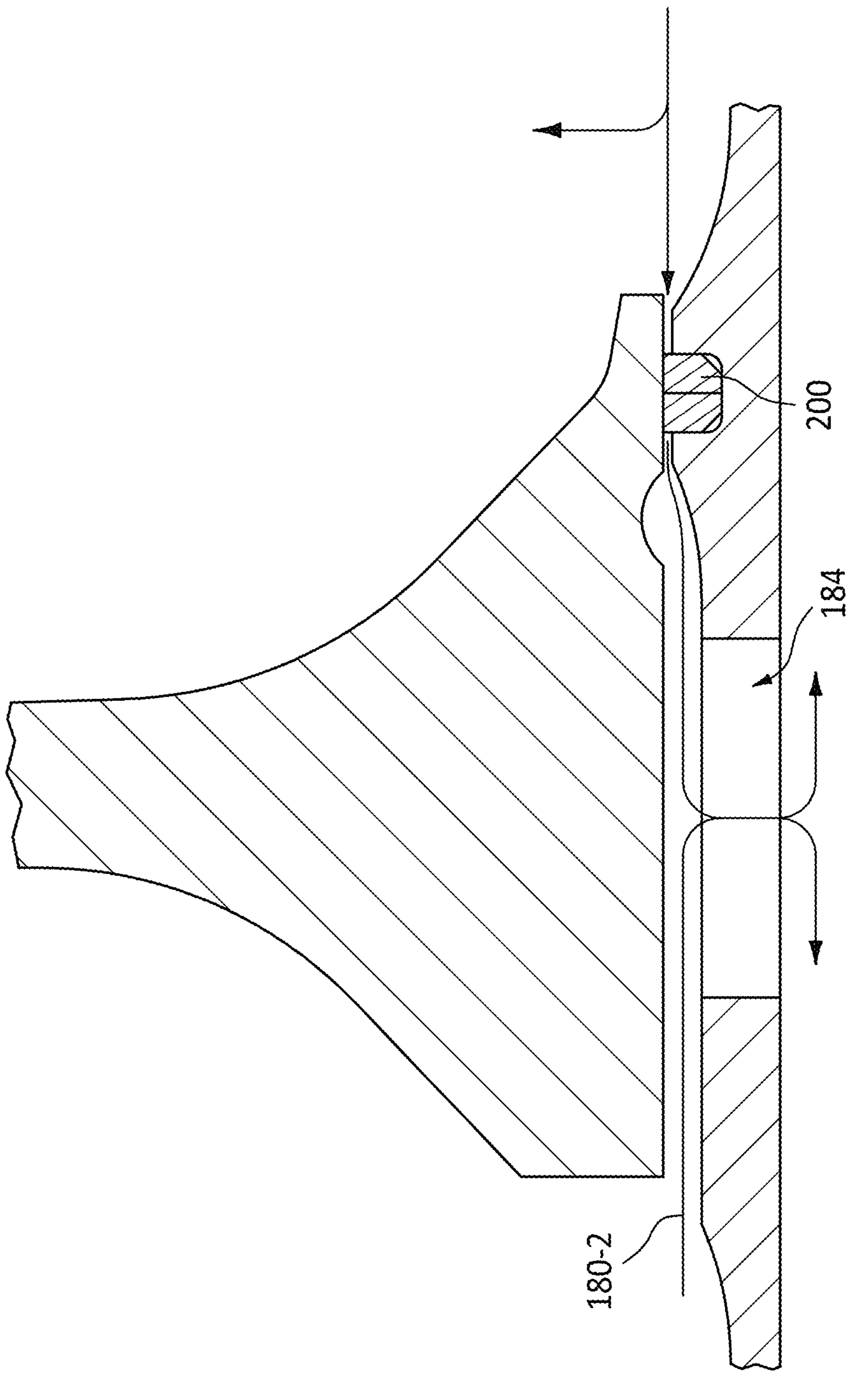
FIG. 2 (PRIOR ART)
FIG. 2 is a view of a prior art seal region.

FIG. 1B shows an enlarged view of the seal 120 interactions with the shaft and the associated disk bore. FIG. 2 shows a hypothetical baseline seal as a piston seal ring 200 captured in a groove in the shaft and having an OD surface engaging an ID surface of the associated disk bore (e.g., in this case, a rearwardly extending foot). The seal 200 is a split ring seal. The split creates an asymmetric leakage flow (unnumbered branching off 190-2) through the seal split (e.g., shiplap joint). A number of proposals attempt to compensate for this by introducing additional leakage flows to mitigate the asymmetry. However, the additional leakage flows do not fully eliminate asymmetry and may reduce process efficiency.

The revised engine of FIG. 1B essentially removes the aft wall of the baseline groove to create an aftward and radially outwardly open shoulder 220 having an ID surface 222 and a rearwardly facing forward surface 224 (of the former forward wall 225 which becomes an outward flange). This shoulder or shoulder compartment 220 thus receives an inwardly directed terminal flange 230 of the seal 120. The flange 230 is at the aft end of a sleeve section 232 and has an inward radial face 234 contacting the surface 222 and a radially extending forward face 236 contacting the face 224. A forward end of the seal is formed by a rearwardly open C-section channel 240. The channel has an inner section 242 merging with the sleeve 232, a radially outwardly extending web 244, and a rearwardly extending outer wall 246 extending to a rim 248. The web/wall 244 has an aft surface 250 and a forward surface 252. The outer wall 246 has an ID surface 254 and an OD surface 256. The disk bore has a forwardly protruding section 260 received in the channel with a forward rim section 262 contacting the surface 250 and an OD surface section 264 contacting the surface 254. The contact between the surfaces 224/236 on the one hand and 250/262 on the other hand places the sleeve section 232 in axial tension. It also applies a forward force to the shaft and a rearward force to the disk. This effectively creates a step-up in disk-to-disk forces from ahead of to behind the subject disk. The engagement between the seal and the shaft on the one hand and disk on the other hand may limit relative movement. This may limit wearing of surfaces. For example, a conventional PSR will tend to move radially outward in its groove to accommodate the relative radial displacement of the bore and to accommodate vibration, etc. In distinction, the seal 120 may flex. For example, with increasing speed, the sleeve 232 may cone slightly outward from aft to fore and the channel 240 may open radially slightly to accommodate relative radial displacement of the disk bore. The seal 120 thus forms the OD boundary of a plenum 185 with a forward annular inlet 186 and the holes 184 in an ID boundary formed by the shaft.

Figure 3:
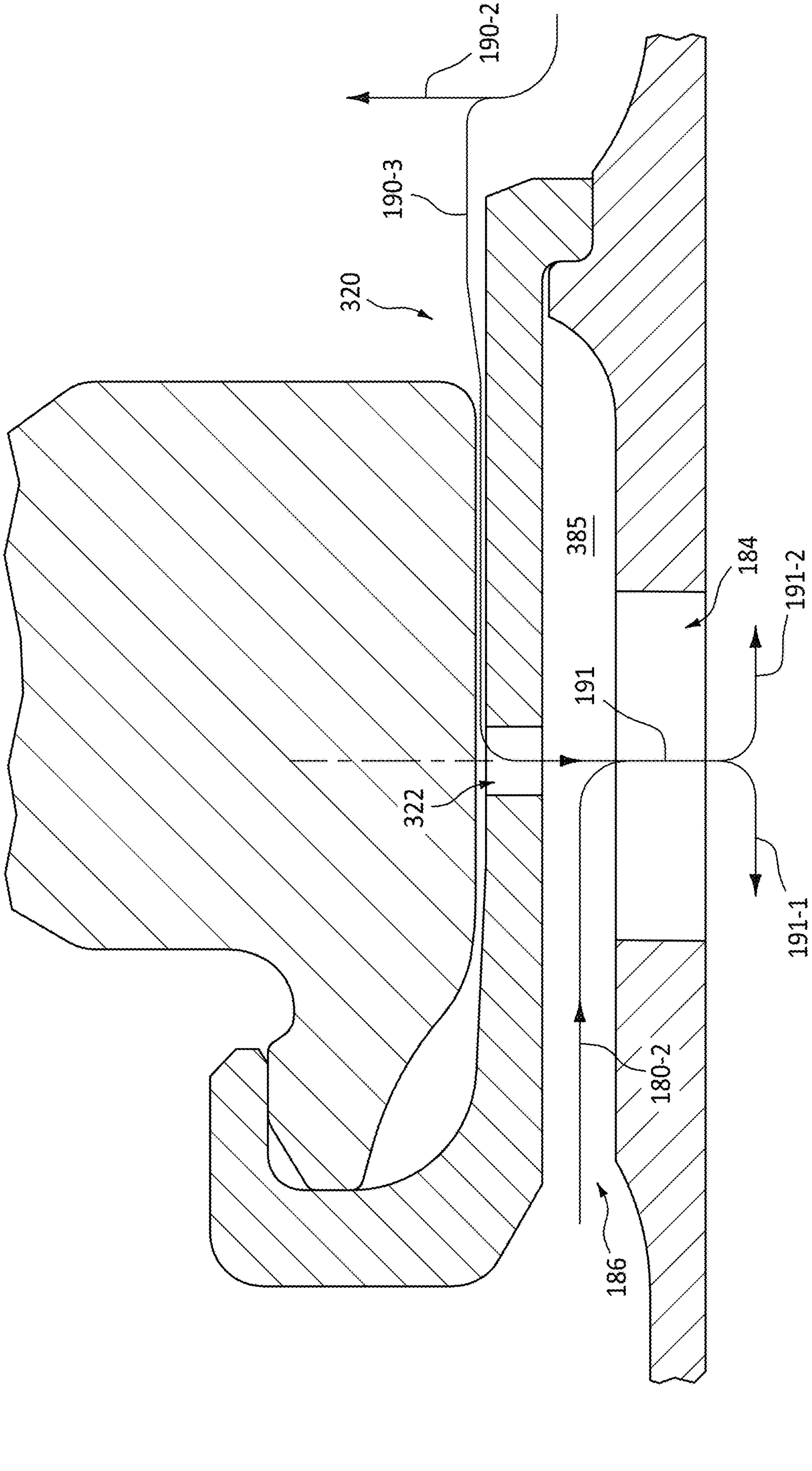
FIG. 3 is a sectional view of a first modification of the seal region of FIG. 1B.

FIG. 3 shows a modified seal 320 that adds a symmetric seal bypass from the flow 190 to merge in a plenum 385 with the flow 180-2. Relative to the seal 120, the seal 320 has a circumferential array of equally spaced through-holes 322 in its sleeve section that form plenum inlets for respective sub-branches of the flow 190. In this example, a further branch 190-3 of the flow 190 passes forward between the sleeve and the ID surface of the disk bore to then pass radially inward through the holes 322 (as said respective sub-branches) whereupon it joins the flow 180-2. This combined flow 191 passes radially inward from the plenum 385 through the shaft holes 184 to then branch fore and aft to the bearing compartments as 191-1 and 191-2.

Figure 5:
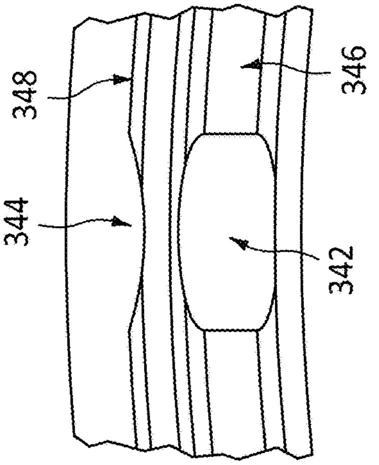
FIG. 5 is a partial forward end view of a disk bore projection in the seal region of FIG. 4.
Figure 4:
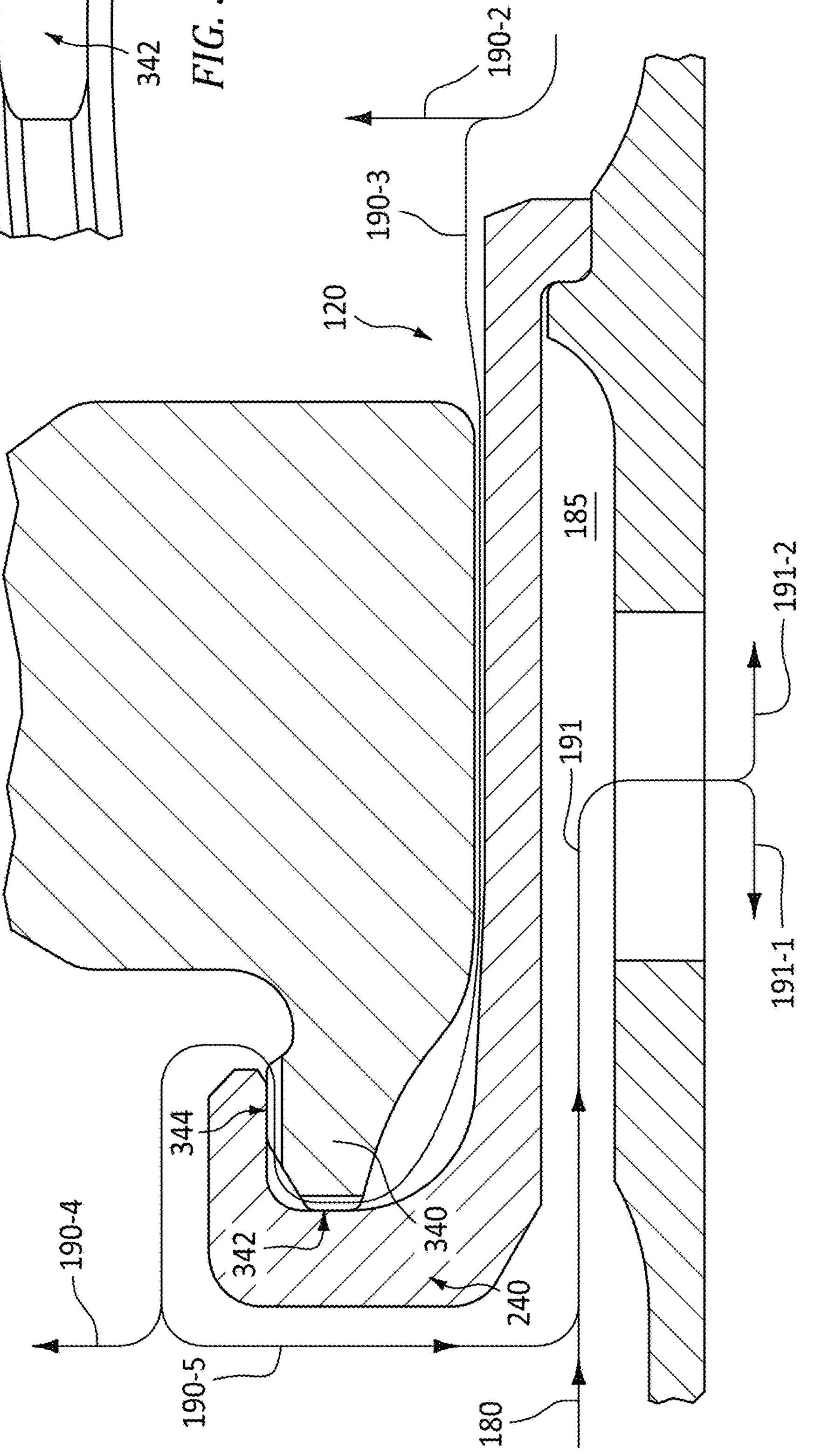
FIG. 4 is a view of a second modification of the seal region.

FIG. 4 shows a modified scaling interaction wherein a circumferential array of equally spaced venting apertures/pathways are formed between the seal channel section 240 and a modified bore forward projection 340 replacing the FIG. 1B projection 260. The projection 340 has respective circumferential arrays of forward rim recesses 342 and OD recesses 344 leaving intact rim material as protrusions 346 and 348 (FIG. 5). In this example, the branch 190-3 flows completely forwardly between the seal and the bore ID surface to then pass through the vents. The branch 190-3 may then branch into further branches 190-4 and 190-5. This modified sealing interaction would provide better thermal conditioning of the subject disk than the holes in modified seal 320.

Figure 7:
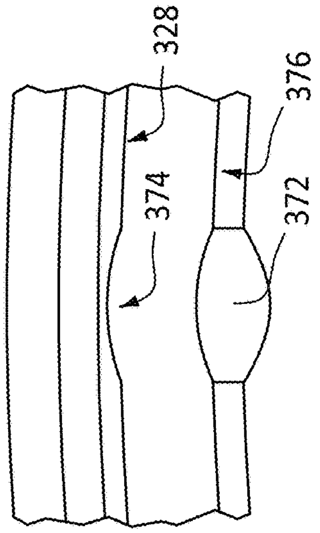
FIG. 7 is a partial rear end view of a seal channel in the seal region of FIG. 6.
Figure 6:
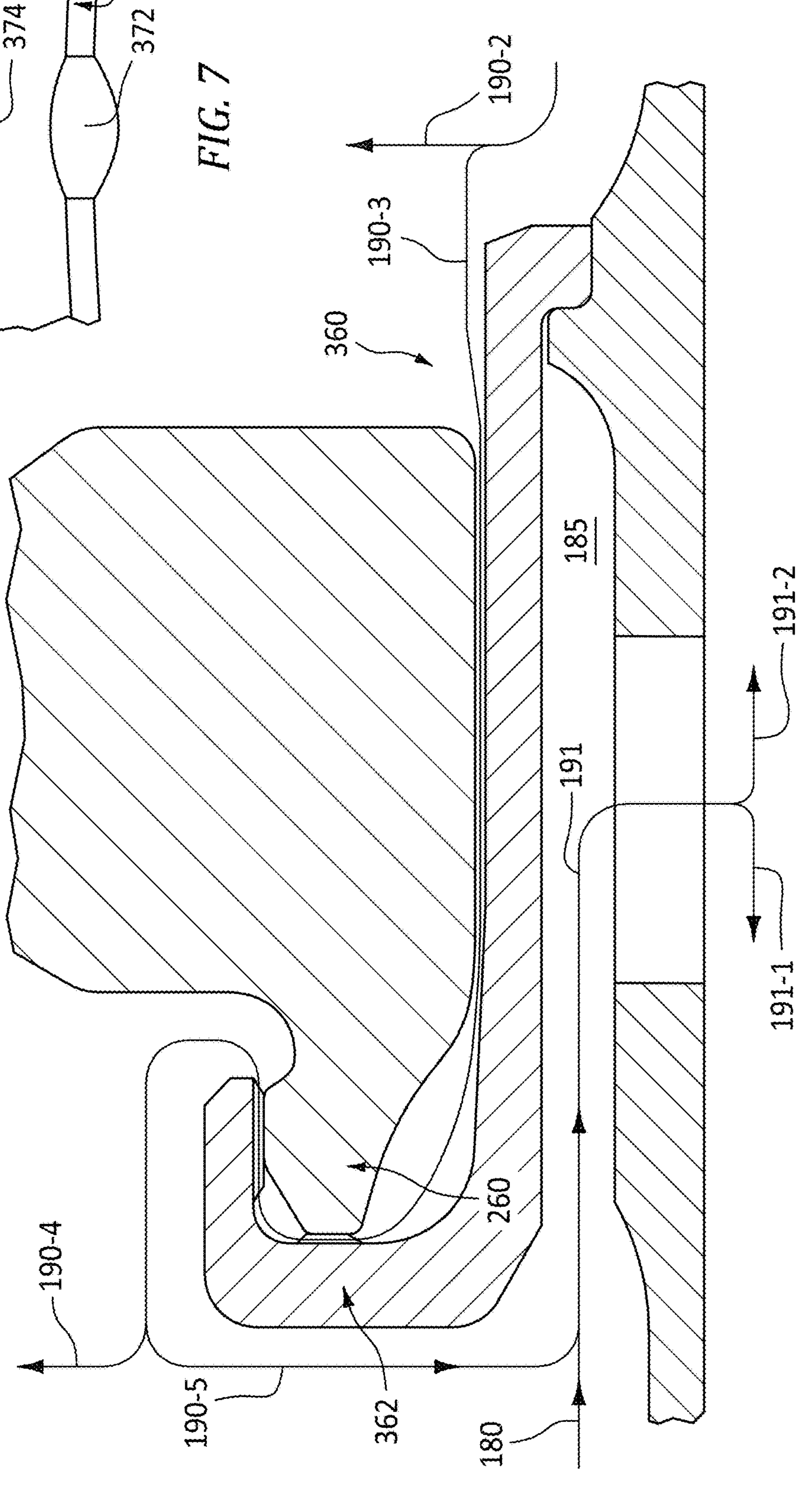
FIG. 6 is a third modification of the seal region.
Figure 8:
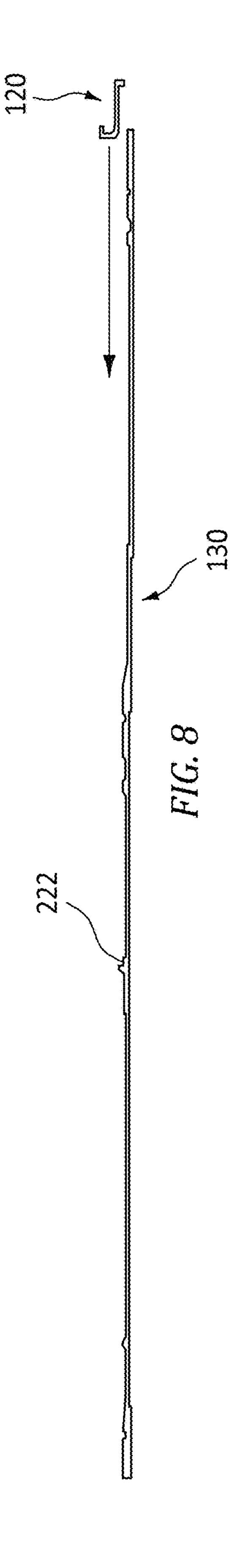
FIG. 8 is a view of a first stage of rotor assembly.
Figure 9:
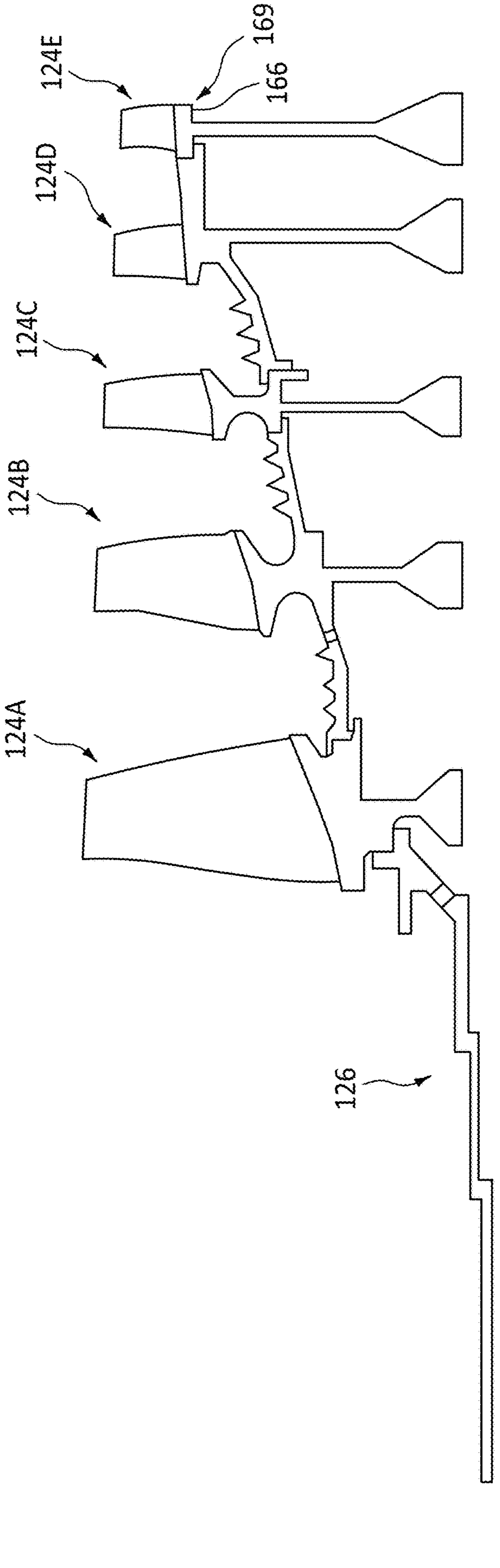
FIG. 9 is a view of an intermediate stage of rotor assembly.

FIG. 6 shows yet another implementation wherein the seal 360 has a modified channel 362 that forms the vents, leaving the projection 260 intact with full annular surfaces. FIG. 7 shows recesses 372 and 374 in the aft and ID surfaces of the channel, respectively, leaving intact material from the annulus at 376 and 378. The venting may be otherwise the same as FIG. 6. FIG. 8 shows the seal 120 being installed to the shaft 130. Example installation is a thermal interference fit translation. For example, the seal 120 may be preheated so that its aft end/ID flange ID surface 234 expands to clear the surface 222 as the translation brings the surfaces 236 and 224 (FIG. 1B) into contact. Before, after, or in parallel with this seal installation, FIG. 9 shows the preassembly of the front hub 126 with the disks 124A-124E. The example disks may be sequentially installed via translation and thermal interference fitting. In one example, the nature of thermal interference fit depends on a particular orientation of the joints at the ends of the spacers. In the illustrated example, each sequential disk from 124A through 124E engages the prior disk with a radially inward facing shoulder surface of the added disk engaging an OD surface of the prior disk. Thus, each disk may be sequentially heated to expand prior to installation via translation. After the FIG. 9 subassembly is formed, the assembled seal 120 and shaft may be inserted and threaded into engagement.

Figure 10:
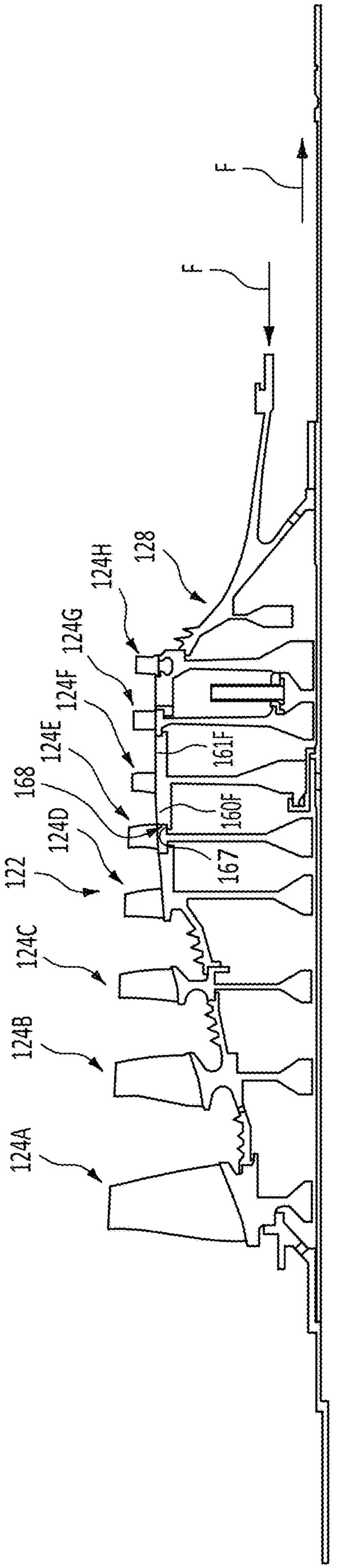
FIG. 10 is a view of a subsequent stage of rotor and shaft assembly.

As is seen in FIG. 10, the next disk 124F is the disk that will engage the seal 120. Thus, it may not be desirable to have to heat this disk because such heating will reduce radial clearance between the projection 260 and the OD wall 246 of the channel 240. Accordingly, the disk 124F has, at the end of its forward spacer 160F, a radially outwardly facing surface 167 (ID face of an interior shoulder 168) for engaging an aft underside region 166 (FIG. 9) of the rim of the disk 124E which is an ID face of an exterior radially outwardly open shoulder 169. Thus, installation of the disk 124F may be via translation while the disk 124E is still hot and expanded or, the disk 124E may be reheated. This then allows for thermal interference between the disks 124E and 124F when a more isothermal addition is reached (e.g., cooling to ambient temperature). This translation of the disk 124F causes initial engagement of the disk and seal with the projection 260 being received in the channel 240.

In one group of embodiments, there is a static radial clearance between the projection 260 and the channel 240 OD wall 246. This clearance may close in operation due to centrifugal loading drawing the disk bore radially outward relative to the shaft. In such situations, it may be unnecessary to take steps for providing a thermal interference fit of the seal and disk bore. However, in others there may be a thermal interference fit. Again, this might be achieved by installing the disk 124F while the seal is still hot from its thermal interference fitting to the shaft. Or, the seal may be reheated. Static radial clearance may provide case of assembly but the drawback is increased relative motion (and wear). Static interference may decrease relative motion but it may make assembly more difficult (due to thermal interference differential heatings).

After installation of the disk 124F, the remaining disks can be installed. Again, the disk 124G in the illustrated embodiment would be heated to expand its outer rim to be received in the radially outwardly open shoulder of the rear spacer 161F of the disk 124F. The disk 124H engages the underside of the rim of the disk 124G at the aft rim thereof. Thus, the disk 124H may be installed prior to the disk 124G cooling so as to provide an interference fit. In the illustrated example, the rear hub 128 has a radially outwardly open shoulder receiving an aft portion of the rear rim of the disk 124H. This may be a thermal interference fit or a mechanical interference fit.

The relative angling of the rear hub means that axial compression may tend to radially outwardly drive the forward rim thereof to engage the disk 124H thus obviating the need for thermal interference fit. However, if thermal interference fit is desired, the disk 124H may be heated to expand after it is installed to the disk 124G. There are, however, other possible combinations of heatings including forming yet further sub-assemblies (e.g., of two disks which are then installed as a unit).

Pre-tensioning is then provided by engaging the rear hub 128 with a fixture so as to provide a forward force while engaging an aft portion of the shaft to provide a tensile force (both shown as F being equal and opposite). This application of force drives the kickstand section 140 forward, whereupon the nut 138 may be tightened. Thereafter the force application may be released and fixtures disengaged allowing further assembly into an engine. The force release may bring the projection 260 end 22 into contact or firmer contact with the channel 240 surface 250 and may place the seal in axial tension.

Figure 12:
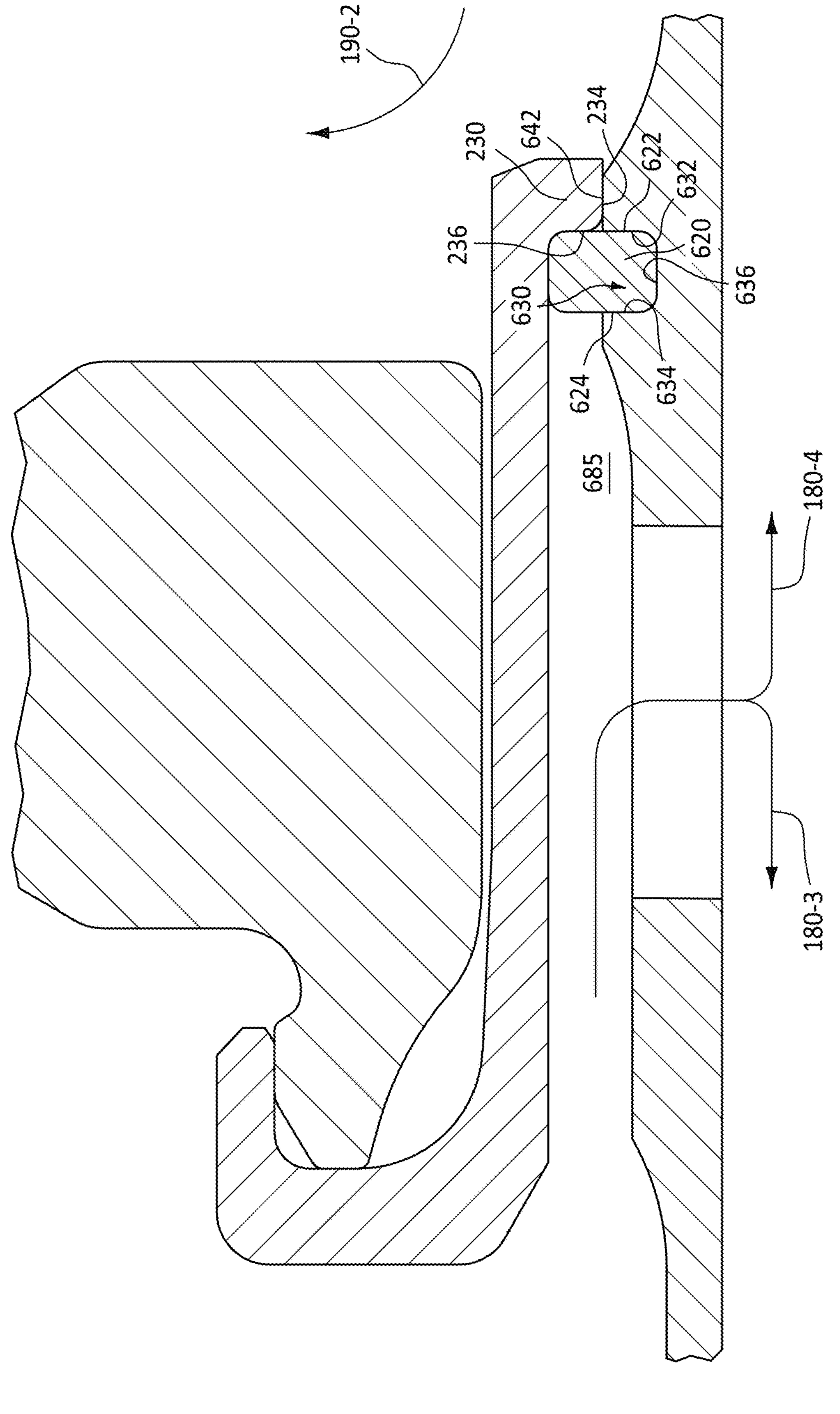
FIG. 12 is a sectional view of a fourth modification of the seal region.

In a further variation, FIG. 12 shows an embodiment using the seal of any of the aforementioned embodiments, or similar (but illustrated with the seal 120), but wherein instead of direct contact of the surface 236 with an aft shoulder surface of a shaft main piece, the surface 236 contacts the aft surface 622 of a retaining ring 620 protruding from an OD groove 630 in the shaft main piece. The ring 620 may be a split ring and the groove may be a baseline PSR groove or otherwise similarly shaped and constructed. In this example, there is still radial thermal interference fit between surfaces 234 of the flange 230 and the abutting surface (in this case the radial apex 642 of the aft wall section forming the groove 630). Assembly may generally be similar to that described above with the ring 620 installed before beginning to slide the seal into place, the ring may be drawn over the surface 642 by expanding its split and then relaxed into capture by the groove 630. With seal installation, abutting of the seal surface 236 with the protruding portion of the ring surface 622 will cause the forward surface 624 to bear against the forward wall surface 634 of the groove. Thereafter, longitudinal engagement of the seal to the shaft main piece via the contact at 236/622 and 624/634 prevents any forward movement of the seal (such as any dynamic walking) despite the radial interference fit. In further variations, there may also be radial interference between the seal and ring 620 and ring 620 and groove base surface 636. This may be in distinction to the baseline PSR engagement where the PSR is intended to radially float in the groove. The presence of a small gap/split (not shown) in the ring 620 is irrelevant because a high degree of sealing is provided by the radial interference fit at 234/642. The illustrated annular plenum 685 is thus similar to 185 (or to 385 if a seal such as 320 is used) except for the addition of the ring 620 to shaft flange and seal flange forming the aft end of the plenum.

Additional variations may include the use of coatings for various purposes including case of assembly, environmental protection, hard facing, or lubricity.

Component materials and manufacture techniques and assembly techniques may be otherwise conventional. Additionally, the seal may be manufactured by forging followed by machining. Example materials are nickel-based alloys or superalloys such as IN-718.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline engine or rotor configuration, details of such baseline may influence details of particular implementations. Accordingly, other embodiments are within the scope of the following claims.

What is claimed is:

1. A center-tie turbine engine rotor comprising:

a central shaft; and a disk stack having a plurality of disks encircling the shaft and held by the shaft in axial compression between a forward hub and an aft hub, and further comprising:

a seal having in central axial cross-section:

a rearwardly-open channel receiving a portion of one of the disks;

a sleeve extending rearward from the channel and between the one of the disks and the shaft; and a portion extending radially inward from the sleeve and having a forward surface restrained against forward movement relative to the shaft.

2. The turbine engine rotor of claim 1, wherein:

the restraint is via contacting an aft facing surface of the shaft or a retaining ring carried by the shaft.

3. The turbine engine rotor of claim 1, wherein:

the shaft has a plurality of through-holes axially within a span of the sleeve.

4. The turbine engine rotor of claim 1, wherein:

the shaft is under axial tension; and the seal is under axial tension.

5. The turbine engine rotor of claim 1, further comprising:

a circumferentially distributed plurality of venting gaps between the channel and the one of the disks.

6. The turbine engine rotor of claim 1, wherein:

a rear face of a radial web of the channel contacts the one of the disks.

7. The turbine engine rotor of claim 6, wherein:

an inner diameter face of an outer diameter wall of the channel contacts the one of the disks.

8. The turbine engine rotor of claim 1, wherein:

the portion extending radially inward from the sleeve is in radial interference fit with the shaft.

9. The turbine engine rotor of claim 1, wherein:

the seal is a non-split full annulus.

10. A gas turbine engine comprising the turbine engine rotor of claim 1, wherein the rotor is a high pressure compressor rotor and the gas turbine engine further comprising:

a high pressure turbine rotor co-spooled with the high pressure compressor rotor on a high spool;

a low spool comprising a low pressure compressor rotor and a low pressure turbine rotor;

a combustor; and a gaspath sequentially through the low pressure compressor, high pressure compressor, combustor, high pressure turbine, and low pressure turbine.

11. A method for assembling the turbine engine rotor of claim 1, the method comprising:

assembling the seal to the shaft;

assembling a forward plurality of the disks to each other to form a forward substack;

assembling the forward substack to the shaft;

assembling a rearward plurality of the disks to each other and the forward substack and shaft to form a rearward substack including said one disk; and stretching the shaft to draw the seal to bear against the one disk.

12. The method of claim 11, wherein:

the assembling the seal to the shaft comprises radial thermal interference fitting.

13. The method of claim 12, wherein:

the assembling the rearward plurality of the disks to each other and the forward substack and shaft comprises:

sequential installation of the rearward plurality of disks to the preassembled forward substack and shaft; and the assembling the rearward plurality of the disks to each other and the forward substack and shaft comprises thermally expanding the seal to receive the received portion of the one disk.

14. A method for using the turbine engine rotor of claim 1, the method comprising:

driving rotation of the rotor; and the driving increasing a radial contact pressure between an inner diameter face of an outer diameter wall of the rearwardly-open channel and the received portion of the one of the disks.

15. The method of claim 14, further comprising:

prior to the increasing, the driving closing a radial clearance between the inner diameter face of the outer diameter wall of the rearwardly-open channel and the received portion of the one of the disks.

16. A center-tie turbine engine rotor comprising:

a central shaft; and a disk stack having a plurality of disks encircling the shaft and held in compression by tension in the shaft, and further comprising:

means for sealing between the shaft and a disk of the disk stack and for applying axial bias between the shaft and the disk.

17. The center-tie turbine engine rotor of claim 16, wherein one or more of:

the rotor is a high pressure compressor rotor of a multi-spool engine;

the axial bias is configured to draw the disk rearward; and the means comprises circumferentially distributed venting means.

18. The center-tie turbine engine rotor of claim 16, wherein:

the means comprises circumferentially distributed venting means.

19. The center-tie turbine engine rotor of claim 18, wherein:

the circumferentially distributed venting means comprises a circumferential array of apertures in a sleeve.

20. The center-tie turbine engine rotor of claim 18, wherein the circumferentially distributed venting means comprises:

a first circumferential array of recesses and/or protrusions in/on an inner diameter surface of an outer wall of a channel; and a second circumferential array of recesses and/or protrusions in/on an inner surface of an axial end wall of the channel.

* * * * *